(12) United States Patent
Oishi

(10) Patent No.: US 8,248,411 B2
(45) Date of Patent: Aug. 21, 2012

(54) IMAGE PROCESSING APPARATUS, IMAGE PROCESSING METHOD, AND PROGRAM

(75) Inventor: Tetsu Oishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 403 days.

(21) Appl. No.: 11/531,401

(22) Filed: Sep. 13, 2006

(65) Prior Publication Data

US 2007/0070088 A1 Mar. 29, 2007

(30) Foreign Application Priority Data

Sep. 29, 2005 (JP) ................................. 2005-283296

(51) Int. Cl.
*G06T 15/40* (2006.01)
(52) U.S. Cl. ....................................................... 345/421
(58) Field of Classification Search .................. 345/421, 345/424, 426, 629; 358/1.18
See application file for complete search history.

(56) References Cited

U.S. PATENT DOCUMENTS

| | | | | |
|---|---|---|---|---|
| 4,808,989 A * | 2/1989 | Tabata et al. .................. | 345/545 |
| 5,574,836 A * | 11/1996 | Broemmelsiek ............. | 345/427 |
| 5,687,303 A * | 11/1997 | Motamed et al. ............ | 358/1.18 |
| 5,767,978 A * | 6/1998 | Revankar et al. ............. | 358/296 |
| 5,805,162 A * | 9/1998 | Imai et al. ..................... | 715/788 |
| 6,016,150 A * | 1/2000 | Lengyel et al. ............... | 345/426 |
| 6,073,148 A * | 6/2000 | Rowe et al. ................... | 715/205 |
| 6,266,068 B1 * | 7/2001 | Kang et al. ................... | 345/629 |
| 6,392,644 B1 * | 5/2002 | Miyata et al. ................ | 345/419 |
| 6,480,205 B1 * | 11/2002 | Greene et al. ................ | 345/631 |
| 7,035,463 B1 * | 4/2006 | Monobe et al. .............. | 382/177 |
| 7,453,459 B2 * | 11/2008 | Shekter ........................ | 345/423 |
| 2002/0113787 A1 * | 8/2002 | Ray et al. ...................... | 345/424 |
| 2002/0126138 A1 * | 9/2002 | Shekter ........................ | 345/660 |
| 2004/0066384 A1 | 4/2004 | Ohba | |
| 2004/0114167 A1 | 6/2004 | Imai | |
| 2006/0103671 A1 | 5/2006 | Brown | |

FOREIGN PATENT DOCUMENTS

| | | |
|---|---|---|
| JP | 10-162163 A | 6/1998 |
| JP | 2004-193876 A | 7/2004 |
| JP | 2004-348702 A | 12/2004 |
| JP | 2006-504191 T | 2/2006 |

* cited by examiner

*Primary Examiner* — Amare Mengistu
*Assistant Examiner* — Aaron M Guertin
(74) *Attorney, Agent, or Firm* — Canon U.S.A., Inc. IP Division

(57) ABSTRACT

An image processing apparatus includes a grouping unit configured to group rendering data into a first group that is to be rendered with a painter's algorithm and a second group that is to be rendered with a scanline algorithm, and an output unit configured to output the rendering data grouped by the grouping unit.

15 Claims, 16 Drawing Sheets

FIG.11

| ID (1101) | TOP-LEFT COORDINATES OF THE CIRCUMSCRIBING RECTANGLE (1102) | BOTTOM-RIGHT COORDINATES OF THE CIRCUMSCRIBING RECTANGLE (1103) | TYPE OF THE RENDERING DATA (1104) |
|---|---|---|---|
| 1 | x1, y1 | x2, y2 | CIRCLE |
| 2 | x3, y3 | x4, y4 | TEXT |
| 3 | x5, y5 | x6, y6 | TRIANGLE |
| 4 | x7, y7 | x8, y8 | RECTANGLE |
| 5 | x9, y9 | x10, y10 | TEXT |
| . | . | . | . |
| . | . | . | . |
| . | . | . | . |

FIG.15

STORAGE MEDIUM SUCH AS FD/CD-ROM

| DIRECTORY INFORMATION |
|---|
| FIRST DATA PROCESSING PROGRAM<br>GROUP OF PROGRAM CODES CORRESPONDING TO<br>EACH STEP OF THE FLOW CHART OF FIG. 10 |
| SECOND DATA PROCESSING PROGRAM<br>GROUP OF PROGRAM CODES CORRESPONDING TO<br>EACH STEP OF THE FLOW CHART OF FIG. 12 |
| THIRD DATA PROCESSING PROGRAM<br>GROUP OF PROGRAM CODES CORRESPONDING TO<br>EACH STEP OF THE FLOW CHART OF FIG. 13 |
| FOURTH DATA PROCESSING PROGRAM<br>GROUP OF PROGRAM CODES CORRESPONDING TO<br>EACH STEP OF THE FLOW CHART OF FIG. 14 |
| |

MEMORY-MAP OF STORAGE MEDIUM

--Prior Art--

IMAGE PROCESSING APPARATUS, IMAGE PROCESSING METHOD, AND PROGRAM

BACKGROUND OF THE INVENTION

1. Field of the Invention

The present invention generally relates to a grouping method used in image processing, and in particular, to a method of grouping rendering data in an information processing system such as a personal computer.

2. Description of the Related Art

In recent years, distributed processing using a multi-central processing unit (CPU) has been utilized in a computing machine terminal such as a personal computer and a workstation.

However, with respect to rendering data transferred by an application, a processing process is not considered. Accordingly, distributed processing using a multi-CPU and plural modules cannot be effectively performed.

In order to perform distributed processing, a grouping of rendering data may be necessary.

Japanese Patent Application Laid-Open No. 2004-193876 discusses a method of grouping rendering data that has overlapping regions.

FIG. 16 is a diagram illustrating a conventional method of grouping rendering data.

In the conventional method of grouping, however, only rendering data having overlapping regions is grouped.

In the conventional grouping method, the produced groups may not obtain sufficient advantage of the distributed processing of rendering data.

In this regard, to describe broadly, there are two methods for the rendering processing of rendering data.

Namely, there are a scanline algorithm and a painter's algorithm.

In the scanline algorithm, each rendering data is divided per each scan line (group of pixels in a horizontal direction) (resulting divided data is called a "segment").

Then, values of depth (Z-axis values) of the segments that share the same scan line are compared to each other, and only the segment that is positioned closer to the front (that is, the segment that is higher in the Z-axis) is rendered.

In the scanline algorithm, this processing is performed on all of the scan lines on a screen.

Note that the scanline algorithm is effective for rendering complicated rendering data that has very many overlapping regions.

However, the speed of processing texts when the scanline algorithm is used is slow because texts have very many edges.

On the other hand, in the painter's algorithm, objects are rendered in the order from an object positioned closer to the back (lower in the Z-axis) to an object positioned closer to the front.

The painter's algorithm is effective in rendering the rendering data that has fewer overlapping regions.

However, in rendering the rendering data that has many overlapping regions, it takes long time to perform the processing, and transmission processing cannot be performed.

Thus, with respect to a group formed by grouping rendering data having overlapping regions, as used in the conventional grouping method, processing cannot be effectively and appropriately performed even using any one of the above-described rendering methods.

SUMMARY OF THE INVENTION

Embodiments of the present invention are devised in order to solve or at least mitigate the above disadvantages.

At least one embodiment of the present invention is directed to a mechanism for grouping rendering data so as to provide an advantage to image processing and to effectively use distributed processing with a multi-CPU.

According to an aspect of the present invention, at least one embodiment is directed to an image processing apparatus including a grouping unit and an output unit. The grouping unit is configured to group rendering data into a first group that is to be rendered with a painter's algorithm and a second group that is to be rendered with a scanline algorithm. The output unit is configured to output the rendering data grouped by the grouping unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a diagram illustrating a configuration of a circumscribing region table that is produced by a data circumscribing region storing unit shown in FIG. 9 and stored in a main storage device.

FIG. 15 is a diagram illustrating a memory map of a storage medium (recording medium) that stores various kinds of data processing programs that can be read by an apparatus (computer) to which an image processing apparatus (image processing method) according to an embodiment of the present invention can be applied.

DETAILED DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Exemplary Embodiment

Figure 1:
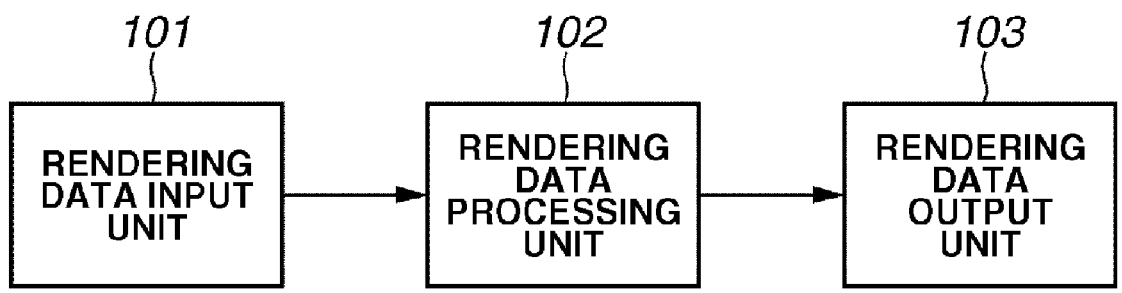
FIG. 1 is a block diagram illustrating an overall configuration of a rendering data grouping processing unit in an image processing apparatus (image processing method) according to an embodiment of the present invention.

FIG. 1 is a block diagram illustrating an overall configuration of a rendering data grouping processing unit in an image processing apparatus (image processing method) according to an embodiment of the present invention.

Referring to FIG. 1, the rendering data grouping processing unit includes a rendering data input unit 101, a rendering data processing unit 102, and a rendering data output unit 103.

The rendering data input unit 101 inputs rendering data.

Note that the rendering data includes a plurality of respective rendering data for rendering objects such as text, graphics, and images.

The rendering data processing unit 102 performs a grouping processing of the rendering data input by the rendering data input unit 101.

The rendering data output unit 103 outputs the rendering data subjected to a grouping processing by the rendering data processing unit 102.

Figure 2:
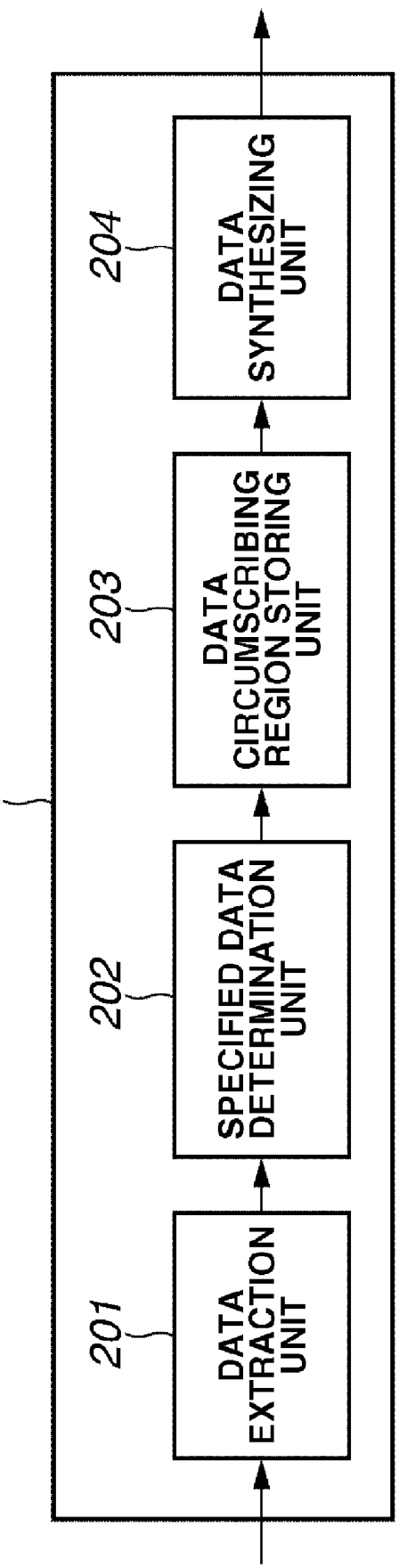
FIG. 2 is a block diagram illustrating a detailed configuration of a rendering data processing unit shown in FIG. 1.

FIG. 2 is a block diagram illustrating a detailed configuration of the rendering data processing unit 102 shown in FIG. 1.

Referring to FIG. 2, a data extraction unit 201 extracts each rendering data for rendering objects such as text, graphics, and images.

A data circumscribing region storing unit 203 produces and stores circumscribing region data of each rendering data extracted by the data extraction unit 201.

A specified data determination unit 202 determines whether each rendering data extracted by the data extraction unit 201 is specified rendering data that is previously set, by using the circumscribing region data produced by the data circumscribing region storing unit 203.

Note that the specified rendering data that is previously set refers to rendering data corresponding to a "top text", for example.

Figure 3:
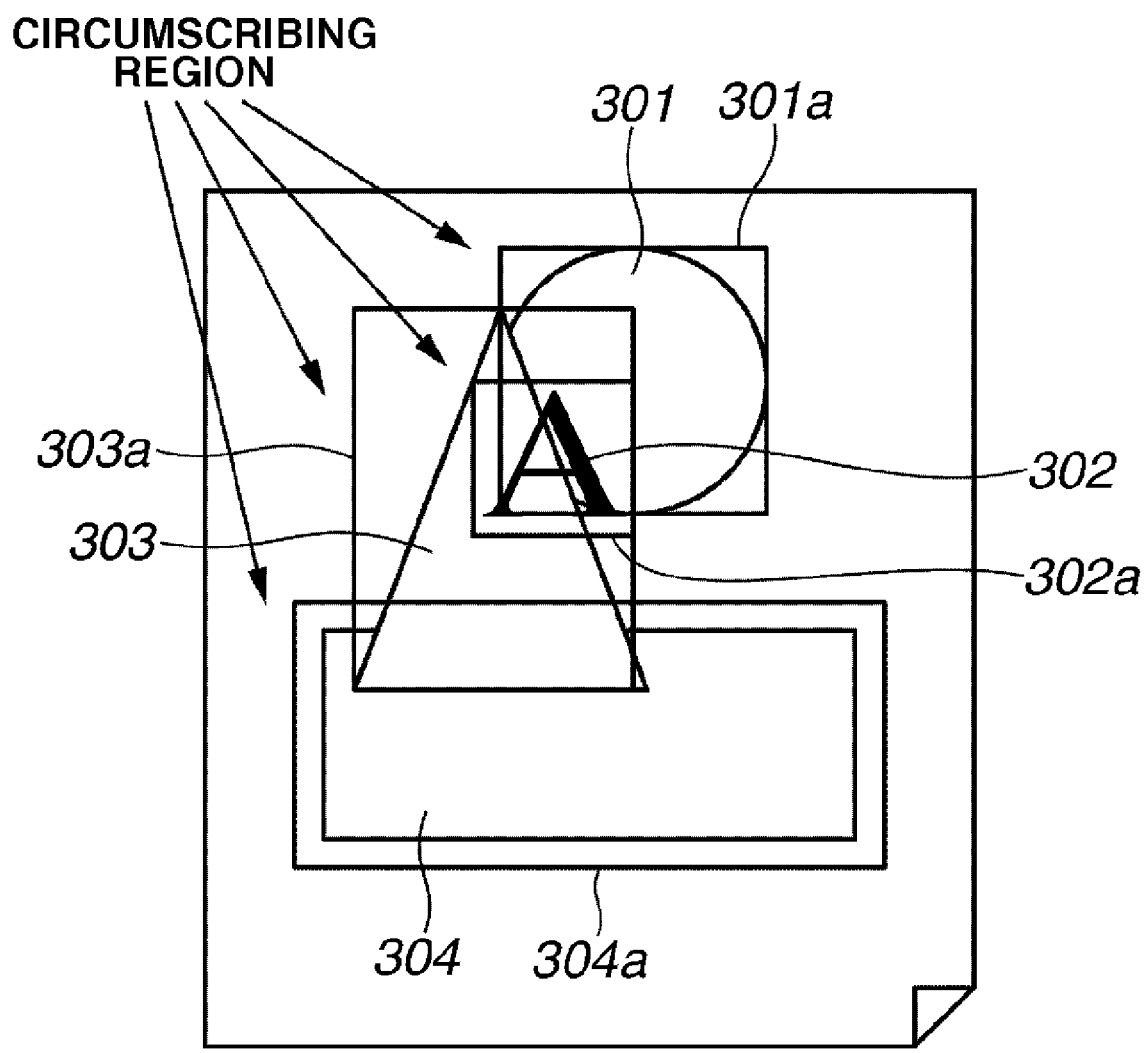
FIG. 3 is a diagram illustrating an example of a method by which a specified data determination unit determines a top text that is specified rendering data by using circumscribing region data according to an embodiment of the present invention.

In this example, the specified data determination unit 202 determines whether the rendering data is a top text in a manner as described in FIG. 3.

A data synthesizing unit 204 makes a group of the specified rendering data determined by the specified data determination unit 202 and a group of rendering data other than the specified rendering data.

FIG. 3 is a diagram illustrating an example of a method by which the specified data determination unit 202 determines the top text that is the specified rendering data by using the circumscribing region data.

In the example shown in FIG. 3, the rendering data for rendering each of the objects such as a circle 301, a text "A" 302, a triangle 303, and a rectangle 304 is extracted by the data extraction unit 201 from among a group of input rendering data.

In addition, each of the circumscribing region data that is produced and stored by the data circumscribing region storing unit 203, which is data in a circumscribing region of the circle 301, the text "A" 302, the triangle 303, and the rectangle 304, is indicated as circumscribing region data 301a, circumscribing region data 302a, circumscribing region data 303a, and circumscribing region data 304a, respectively.

As shown in FIG. 3, the determination as to whether the text "A" 302 is a top object or not is made by a comparison between the text "A" 302 and other objects that are overlapping in the circumscribing region (namely, the circle 301, the triangle 303, and the rectangle 304), with respect to a position in a Z-axis.

In the example shown in FIG. 3, the circumscribing region 302a for the text "A" 302 overlaps the circumscribing region 301a for the circle 301 and the circumscribing region 303a for the triangle 303.

Thus, here, the determination as to whether the text "A" 302 is a top object is made by comparison between the text "A" 302 and each of the circle 301 and the triangle 303 with respect to a position in the Z-axis.

If the text "A" 302 is higher in the Z-axis than the circle 301 and the triangle 303, the specified data determination unit 202 determines that the text "A" 302 is a top object.

Note that in the example shown in FIG. 3, the circumscribing region 302a for the text "A" 302 does not overlap the circumscribing region 304a for the rectangle 304.

Accordingly, it is not necessary to compare the text "A" 302 and the rectangle 304 as to which of the text "A" 302 and the rectangle 304 is higher in the Z-axis.

That is, here, the specified data determination unit 202 does not compare the text "A" 302 and the rectangle 304 as to which is higher in the Z-axis.

That is, a circumscribing region for another object is not rendered on the circumscribing region for the top text in an overlapping manner.

Note that the specified rendering data is not limited to the rendering data that is the "top text".

For example, the rendering data that is simply "text" may be set as the specified rendering data.

In addition, the rendering data of any one of "graphics" such as a "circle", a "rectangle", and a "triangle" may be set as the specified rendering data.

In addition, the rendering data of "image data" may be set as the specified rendering data.

In addition, the rendering data of a "background" may be set as the specified rendering data.

In addition, a synthesis of the above-mentioned various rendering data may be set as the specified rendering data.

For example, the rendering data of a "triangle" and the rendering data of a "circle" may be set as the specified rendering data.

Next, a method of grouping is described with reference to FIGS. 4 through 6.

Figure 4:
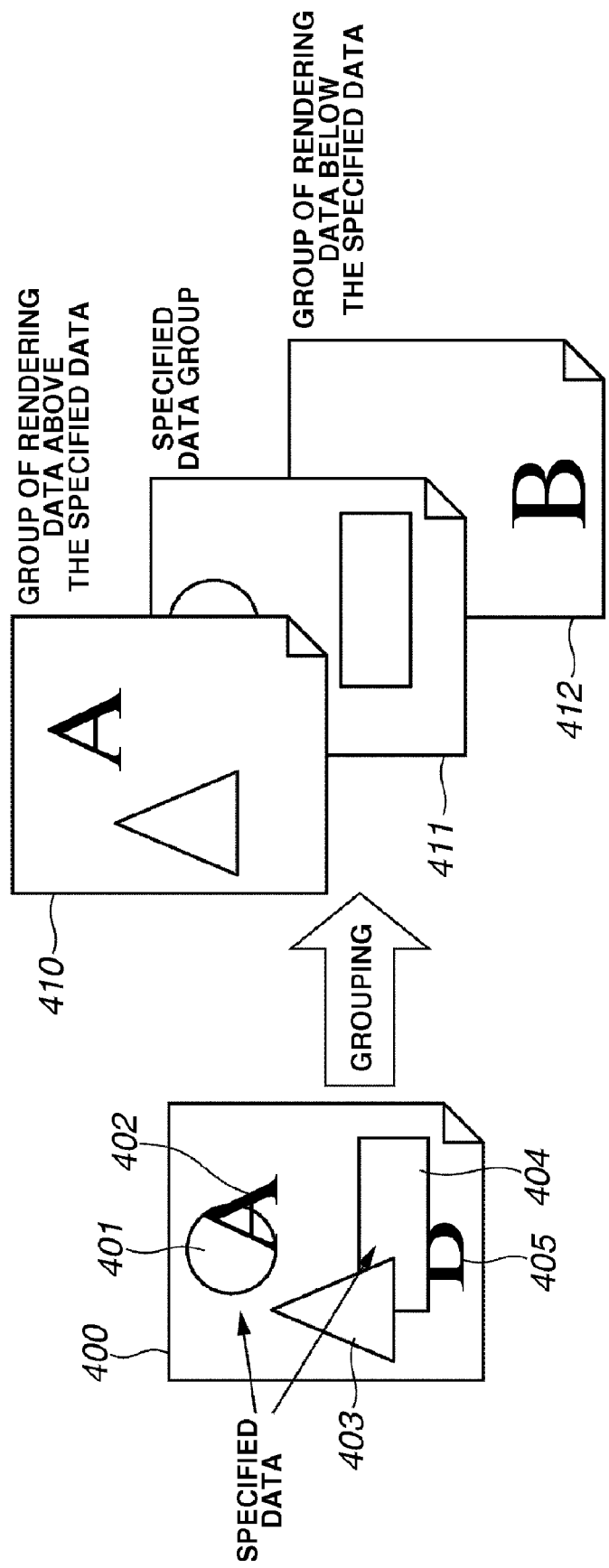
FIG. 4 is a diagram illustrating an exemplary method of grouping by a data synthesizing unit shown in FIG. 2 according to an embodiment of the present invention.

FIG. 4 is a diagram illustrating an exemplary method of grouping by the data synthesizing unit 204 shown in FIG. 2 according to an embodiment of the present invention.

In the example shown in FIG. 4, each rendering data for rendering objects such as a circle 401, text "A" 402, a triangle 403, a rectangle 404, and text "B" 405 is extracted by the data extraction unit 201 from among a group of input rendering data 400.

In addition, the rendering data of the circle 401 and the rendering data of the rectangle 404 are determined as specified rendering data by the specified data determination unit 202.

As shown in FIG. 4, the data synthesizing unit 204 groups the rendering data of the circle 401 and the rendering data of the rectangle 404 as a specified data group 411.

In addition, the data synthesizing unit 204 groups the rendering data of the text "A" 402 and the rendering data of the triangle 403 as a higher layer 410 above the specified rendering data.

In addition, the data synthesizing unit 204 groups the rendering data of the text "B" 405 as a lower layer 412 below the specified rendering data.

The data synthesizing unit 204 adds information indicating the order of rendering to the grouped rendering data.

For example, the data synthesizing unit 204 adds a number "1" to the lower layer group 412, a number "2" to the specified data group 411, and a number "3" to the higher layer group 410.

Then, the rendering data of each group in the form of a command that is provided with the order of rendering is output to a printer by the rendering data output unit 103.

A controller of the printer renders the received rendering data of each of the higher layer group 410, the specified data group 411, and the lower layer group 412 by using the painter's algorithm so as to produce a bitmap image of each rendering data.

Then, the bitmap image of the rendered lower layer group 412, which is the first group, is overwritten with the bitmap image of the rendered specified data group 411, which is the second group, and then the resulting group is overwritten with the bitmap image of the rendered higher layer group 410, which is the third group, so as to synthesize the three groups.

Then, the bitmap image synthesized on a memory is printed out by a printer engine.

In addition, according to another method, the data synthesizing unit 204 adds information indicating the rendering order to each group.

For example, the data synthesizing unit 204 adds a number "1" to the lower layer group 412, a number "2" to the specified data group 411, and a number "3" to the higher layer group 410.

Then, the rendering data of each of the higher layer group 410, the specified data group 411, and the lower layer group 412 is rendered on a memory by using the painter's algorithm.

Then, the rendering data of each group in the form of a bitmap image to which the rendering order is added is output to a printer by the rendering data output unit 103.

Then, the printer overwrites the received bitmap image of the rendered lower layer group 412, which is the first group, with the bitmap image of the rendered specified data group 411, which is the second group.

Next, the resulting group is overwritten with the bitmap image of the rendered higher layer group 410, which is the third group, so as to synthesize the three groups.

The bitmap image synthesized on the memory is printed out by the printer engine.

In addition, according to another method, the data synthesizing unit 204 adds information indicating the rendering order to each group.

For example, the data synthesizing unit 204 adds a number "1" to the lower layer group 412, a number "2" to the specified data group 411, and a number "3" to the higher layer group 410.

Then, the rendering data of each of the higher layer group 410, the specified data group 411, and the lower layer group 412 is rendered on a memory.

Then, the bitmap image of the rendered lower layer group 412, which is the first group, is overwritten with the bitmap image of the rendered specified data group 411, which is the second group, and then the resulting group is overwritten with the bitmap image of the rendered higher layer group 410, which is the third group, so as to synthesize the three groups.

Then, the rendering data output unit 103 outputs the bitmap image of one page of the synthesized data to a printer as the rendering data.

The printer prints out the received rendering data of the bitmap image by using the printer engine.

In the example shown in FIG. 4, the rendering data group 400 is grouped into three layers, namely, the specified data group 411, the higher layer group 410, and the lower layer group 412. However, it is also effective to group the rendering data group 400 into two layers including the higher layer and the lower layer.

Hereinbelow, an example of the two-layer grouping is described with reference to FIG. 5 and FIG. 6.

Figure 5:
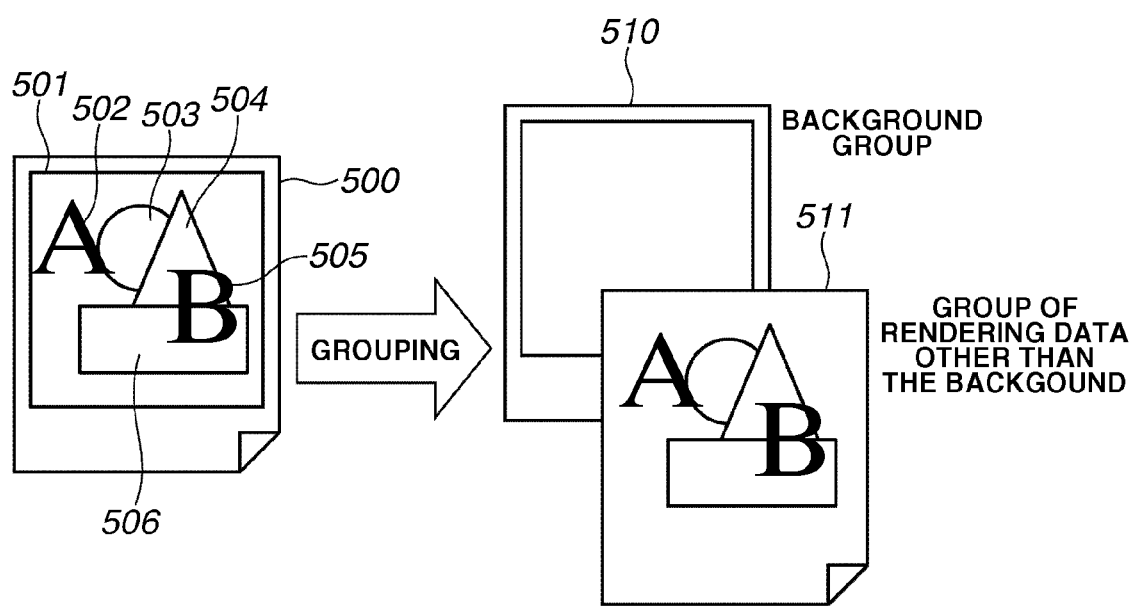
FIG. 5 is a diagram illustrating an exemplary method of grouping by the data synthesizing unit shown in FIG. 2 according to an embodiment of the present invention.

FIG. 5 shows an example in which the rendering data group 400 is grouped into two groups including a background group and a group of rendering data other than the background. FIG. 6 shows an example in which the rendering data group 400 is grouped into two groups including a top text group and a group of rendering data other than the top text.

FIG. 5 is a diagram illustrating an example of the method of grouping by the data synthesizing unit 204 shown in FIG. 2 according to an embodiment of the present invention.

In the example shown in FIG. 5, the rendering data for rendering each of objects such as a background 501, text "A" 502, a circle 503, a triangle 504, text "B" 505, and a rectangle 506 is extracted by the data extraction unit 201 from among a group 500 of input rendering data.

In addition, the rendering data of the background 501 is determined as the specified rendering data by the specified data determination unit 202.

As shown in FIG. 5, the data synthesizing unit 204 groups the rendering data of the background 501, which is the specified rendering data, as a background group 510.

In addition, the data synthesizing unit 204 groups the rendering data other than the background 501 (the rendering data of each of the text "A" 502, the circle 503, the triangle 504, the text "B" 505, and the rectangle 506) as a group 511 of rendering data other than the background.

The data synthesizing unit 204 adds information indicating the rendering order to the grouped rendering data.

For example, the data synthesizing unit 204 adds a number "1" to the background group 510 and a number "2" to the group 511 of rendering data other than the background.

Then, the rendering data of each group in the form of a command that is provided with the order of rendering is output to a printer by the rendering data output unit 103.

The controller of the printer renders the received rendering data of the background group 510 on a memory by using the painter's algorithm and renders the rendering data of the group 511 of rendering data other than the background on the memory by using the scanline algorithm.

Then, the bitmap image of the rendered background group 510, which is the first group, is overwritten with the bitmap image of the rendered group 511 of rendering data other than the background, which is the second group, so as to synthesize the two groups.

Then, the bitmap image on the memory is printed out by a printer engine.

In addition, according to another method, the data synthesizing unit 204 adds information indicating the rendering order to each group.

For example, the data synthesizing unit 204 adds a number "1" to the background group 510 and a number "2" to the group 511 of rendering data other than the background.

Then, the data synthesizing unit 204 renders the rendering data of the background group 510 on a memory by using the painter's algorithm and renders the rendering data of the group 511 of rendering data other than the background on the memory by using the scanline algorithm.

Then, the rendering data of each group in the form of a bitmap image to which the rendering order is added is output to a printer by the rendering data output unit 103.

Then, the printer overwrites the received bitmap image of the background group 510, which is the first group, with the bitmap image of the rendered group 511 of rendering data other than the background, which is the second group, so as to synthesize the two groups.

The bitmap image synthesized on the memory is printed out by a printer engine.

In addition, according to another method, the data synthesizing unit 204 renders the rendering data of the background group 510 into a bitmap image by using the painter's algorithm, renders the rendering data of the group 511 of rendering data other than the background into a bitmap image by using the scanline algorithm, and adds information indicating the rendering order to each rendered group.

For example, the data synthesizing unit 204 adds a number "1" to the background group 510 and a number "2" to the group 511 of rendering data other than the background.

Then, the bitmap image of the rendered background group 510, which is the first group, is overwritten with the bitmap image of the rendered group 511 of rendering data other than the background, which is the second group, so as to synthesize the two groups.

Then, the rendering data output unit 103 outputs the bitmap image of one page of the synthesized data to a printer as the rendering data.

The printer prints out the received rendering data of the bitmap image by using the printer engine.

Figure 6:
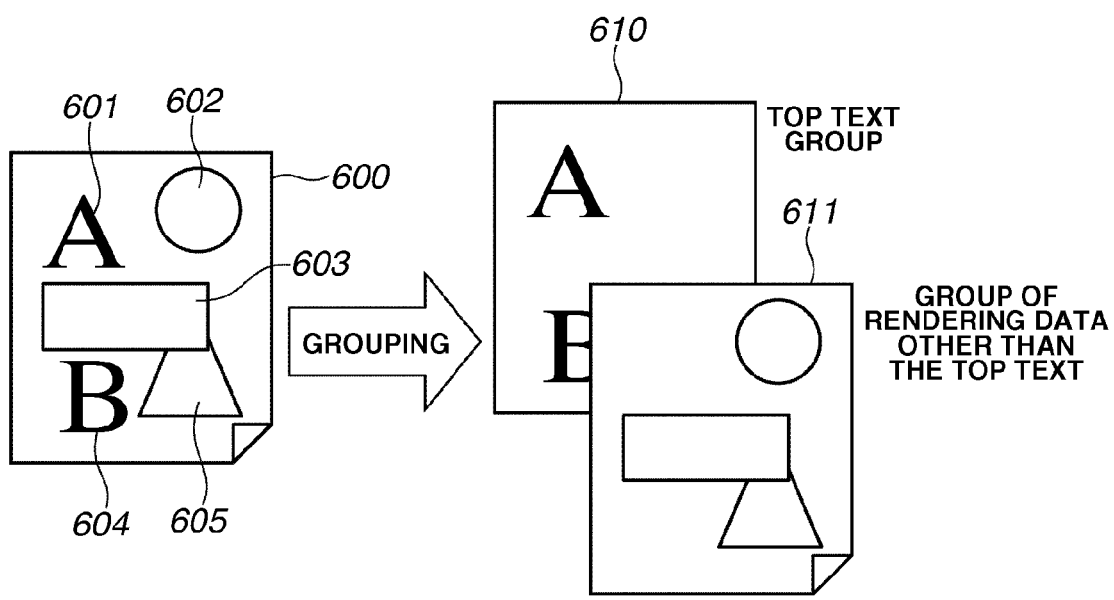
FIG. 6 is a diagram illustrating an exemplary method of grouping by the data synthesizing unit shown in FIG. 2 according to an embodiment of the present invention.

FIG. 6 is a diagram illustrating an example of a method of grouping by the data synthesizing unit 204 shown in FIG. 2 according to an embodiment of the present invention.

In the example shown in FIG. 6, the rendering data for rendering each of objects such as text "A" 601, a circle 602, a rectangle 603, text "B" 604, and a triangle 605 is extracted by the data extraction unit 201 from among a group 600 of input rendering data.

In addition, each rendering data of the text "A" 601 and the text "B" 604, which are the top text, is determined as the specified rendering data by the specified data determination unit 202.

As shown in FIG. 6, the data synthesizing unit 204 groups each rendering data of the top text (the text "A" 601 and the text "B" 604), which is the specified rendering data, as a top text group 610.

In addition, the data synthesizing unit 204 groups the rendering data other than the top text (the rendering data of the circle 602, the rectangle 603, and the triangle 605) as a group 611 of rendering data other than the top text.

The data synthesizing unit 204 adds information indicating the rendering order to the grouped rendering data.

For example, the data synthesizing unit 204 adds a number "1" to the group 611 of rendering data other than the top text and a number "2" to the top text group 610.

Then, the rendering data of each group in the form of a command that is provided with the order of rendering is output to a printer by the rendering data output unit 103.

The controller of the printer renders the received rendering data of the top text group 610 on a memory by using the painter's algorithm and renders the received rendering data of the group 611 of rendering data other than the top text on the memory by using the scanline algorithm.

Then, the bitmap image of the rendered group 611 of rendering data other than the top text, which is the first group, is overwritten with the bitmap image of the rendered top text group 610, which is the second group, so as to synthesize the two groups.

Then, the bitmap image synthesized on the memory is printed out by a printer engine.

Alternatively, the controller of the printer renders the received rendering data of the group 611 of rendering data other than the top text on a memory by using the scanline algorithm.

The controller of the printer overwrites the bitmap image of the rendered group 611 of rendering data other than the top text, which is the first group, with the received rendering data of the top text group 610, which is the second group, by using fonts of the printer so as to produce a bitmap image to be printed.

Then, the bitmap image produced on the memory can be printed by using the printer engine.

In addition, according to another method, the data synthesizing unit 204 adds information indicating the rendering order to each group.

For example, the data synthesizing unit 204 adds a number "1" to the group 611 of rendering data other than the top text and a number "2" to the top text group 610.

Then, the data synthesizing unit 204 renders the rendering data of the top text group 610 into a bitmap image by using the painter's algorithm and renders the rendering data of the group 611 of rendering data other than the top text into a bitmap image by using the scanline algorithm.

Then, the rendering data of each group in the form of a bitmap image that is provided with the order of rendering is output to a printer by the rendering data output unit 103.

Then, the printer overwrites the received bitmap image of the rendered group 611 of rendering data other than the top text, which is the first group, with the bitmap image of the rendered top text group 610, which is the second group, so as to synthesize the two groups.

Then, the bitmap image synthesized on a memory is printed out by the printer engine.

In addition, according to another method, the data synthesizing unit 204 adds information indicating the rendering order to each rendered group.

For example, the data synthesizing unit 204 adds a number "1" to the group 611 of rendering data other than the top text and a number "2" to the top text group 610.

Then, the data synthesizing unit 204 renders the top text group 610 by using the painter's algorithm and renders the group 611 of rendering data other than the top text by using the scanline algorithm.

Then, the data synthesizing unit 204 overwrites the bitmap image of the rendered group 611 of rendering data other than the top text, which is the first group, with the bitmap image of the rendered top text group 610, which is the second group, so as to synthesize the two groups.

Then, the rendering data output unit 103 outputs the bitmap image of one page of the synthesized data to a printer as the rendering data.

The printer prints out the received rendering data of the bitmap image by using the printer engine.

Hereinbelow, an embodiment in which the grouping processing by the rendering data grouping processing unit according to the present embodiment shown in FIGS. 1 through 6 is applied to a print processing system (especially, to a printer driver) is described with reference to FIG. 7, FIG. 8, and FIG. 9.

Note that the grouping processing can also be performed by a printing device, instead of the printer driver.

In addition, the grouping processing can also be performed by a display device or an application that performs bitmap processing.

Figure 7:
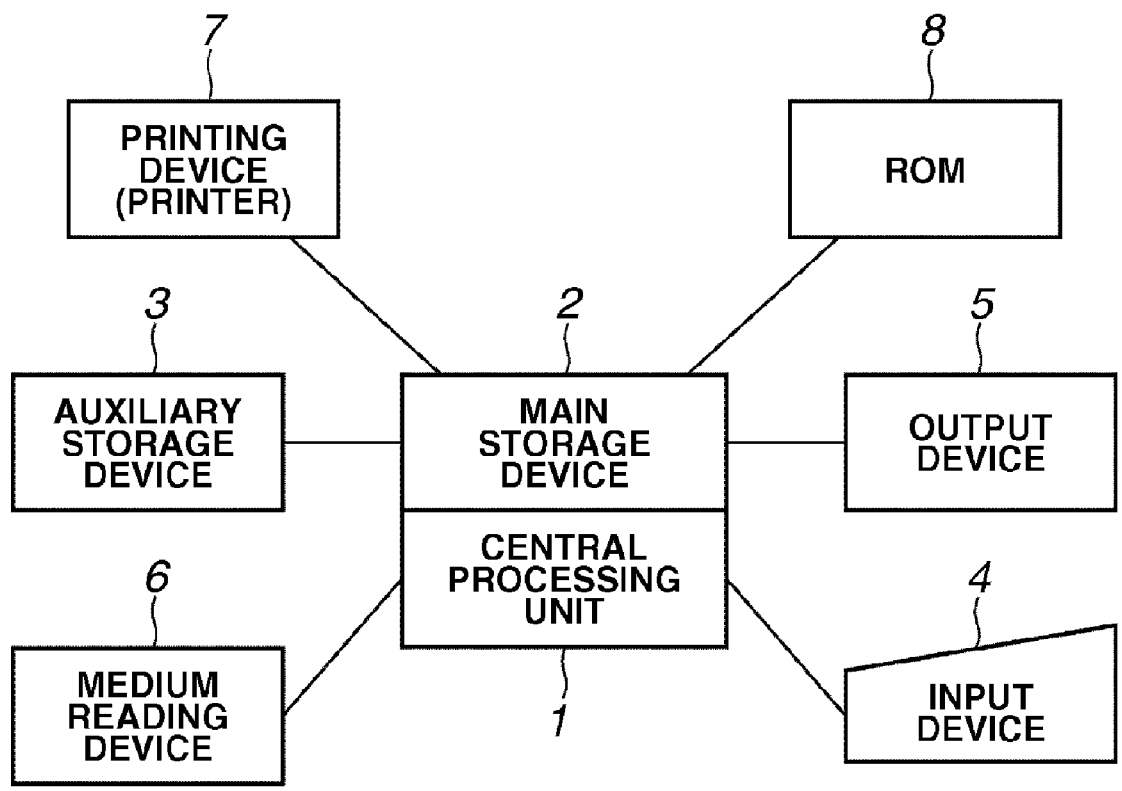
FIG. 7 is a block diagram illustrating an example of a configuration of an information processing system to which an image processing apparatus (image processing method) according to an embodiment of the present invention can be applied.
Figure 8:
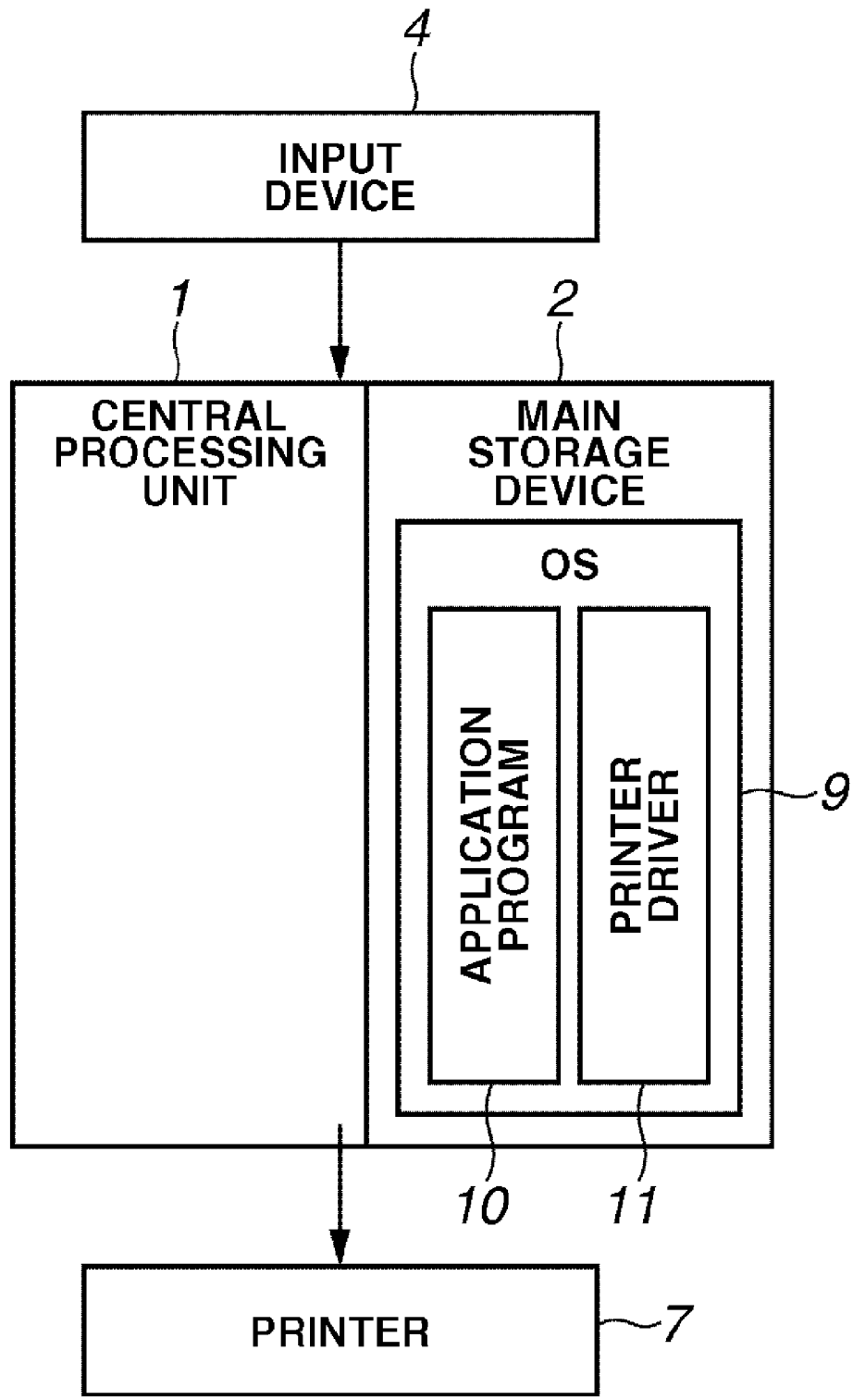
FIG. 8 is a block diagram illustrating an example of a configuration of an information processing system to which an image processing apparatus (image processing method) according to an embodiment of the present invention can be applied.
Figure 9:
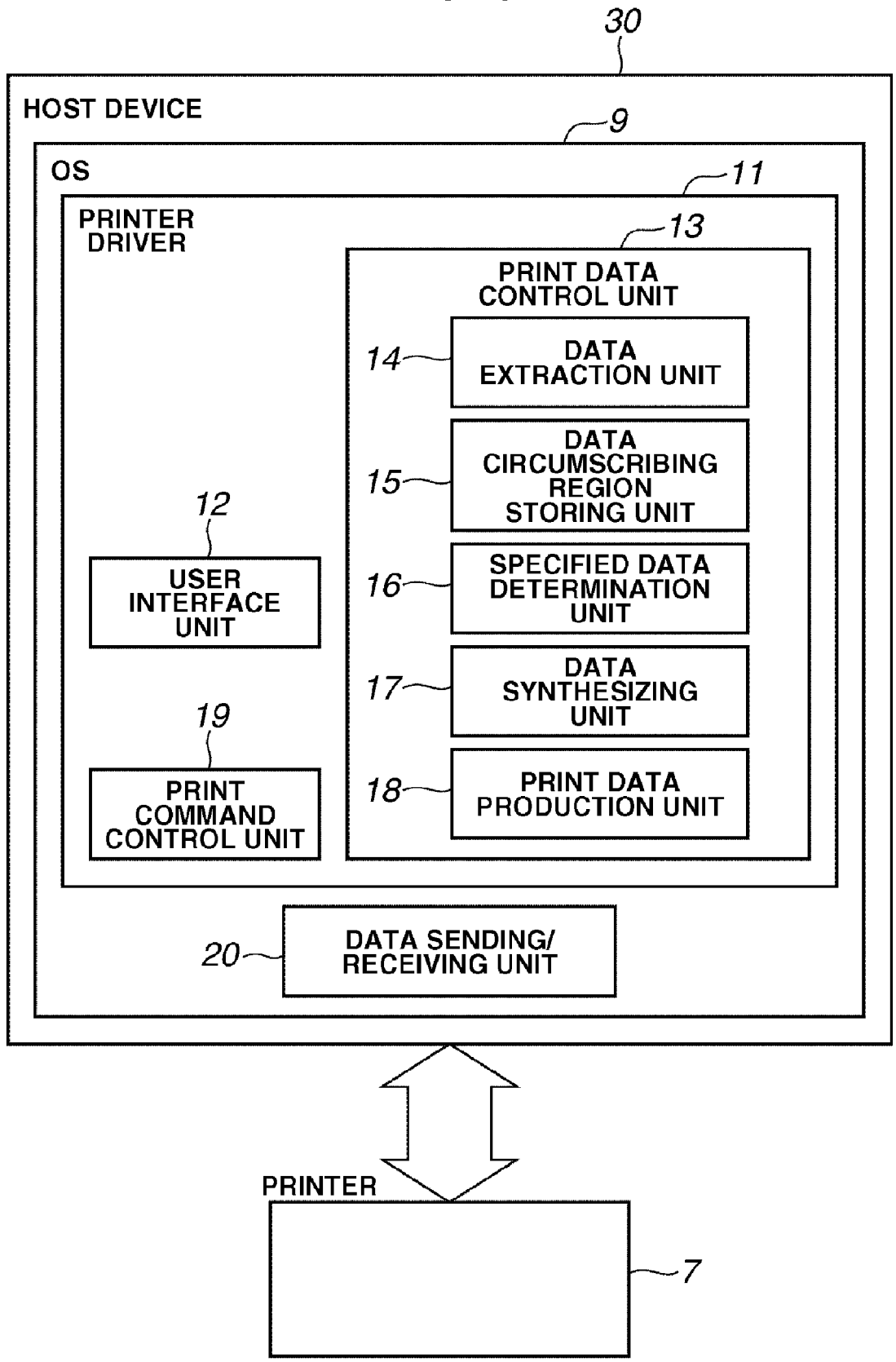
FIG. 9 is a block diagram illustrating an example of a configuration of an information processing system to which an image processing apparatus (image processing method) according to an embodiment of the present invention can be applied.

Each of FIG. 7, FIG. 8, and FIG. 9 is a block diagram illustrating an example of a configuration of an information processing system to which the image processing apparatus (image processing method) can apply. In FIG. 7, FIG. 8, and FIG. 9, similar components are provided with the same reference numerals and symbols.

Note that FIG. 7 illustrates an example of a hardware configuration of the information processing system.

Referring to FIG. 7, a central processing unit 1 can include a plurality of processors (CPUs).

That is, the central processing unit 1 can have a multi-processor configuration.

In the case of the multi-processor configuration, plural processes are performed in a parallel manner by a shared operation of the plural processors. By doing so, the processing performance of the information processing system can be improved.

A main storage device (RAM) 2 is used as a work area for the central processing unit 1.

An auxiliary storage device 3 stores various programs and data that are executed by the central processing unit 1.

A medium reading device 6 reads data from a storage medium such as a flexible disk (FD), a CD-ROM, and an IC memory card.

The central processing unit 1 reads a system program and an application program from the auxiliary storage device 3 or from a storage medium via the medium reading device 6, into the main storage device 2, and executes the programs.

Then, the central processing unit 1 processes information input by a user using an input device 4 and outputs the processed information to an output device 5 or a printing device (printer) 7. A ROM 8 stores data used frequently by the central processing unit 1.

Note that the printer 7 can use any printing system, such as an electrophotographic system, an inkjet system, or a dye-sublimation system.

Note that the output device 5 is a display device and is distinguished from the printer 7, which is essentially one of output devices.

In addition, the input device 4 is configured by a keyboard and a pointing device.

In addition, the auxiliary storage device 3 can include a hard disk and a magneto-optical disk, or can be configured by a combination of a hard disk and a magneto-optical disk.

In addition, the present invention is not limited to the above configuration. That is, the configuration can be such that a plurality of devices are mutually connected via a network.

FIG. 8 is a conceptual diagram illustrating processing in which data related to an image processing method control program is read from a storage medium to the central processing unit 1, a print command is input by a user using the input device 4, and the data is sent to the printer 7 so as to be printed.

FIG. 8 shows an operating system (OS) 9, an application program 10, and a printer driver 11.

The OS 9, the application program 10, and the printer driver 11 are read into the main storage device 2 so as to be executed by the central processing unit 1.

The OS 9 supports a multi-processor configuration. Thus, the OS 9 can be activated even when the central processing unit 1 has the multi-processor configuration.

In addition, the application program 10 and the printer driver 11 function under the control of the OS 9.

Referring to FIG. 9, a host device (a main body of a client computer in the printing system) 30 is connected to the printer 7 via a given interface such as a Centronics interface or the network. The OS 9 controls the host device 30.

The printer driver 11 is application software that controls the printer 7 based on the OS 9. The printer driver 11 includes a user interface unit 12.

The user interface unit 12, according to the present embodiment, allows a user to input various kinds of print settings such as a setting for the specified rendering data to be grouped (for example, the rendering data for rendering the top text) to the printer 7 so as to generate an instruction to start printing.

A print data control unit 13 receives a rendering command specified by the application program 10 and produces data that can be processed by the printing device.

The print data control unit 13 includes an essential processing unit of the host device 30 in the printing system (namely, the rendering data processing unit 102 shown in FIG. 1).

The print data control unit 13 includes a data extraction unit 14 that extracts each piece of rendering data from the input rendering data group.

Note that the data extraction unit 14 corresponds to the data extraction unit 201 shown in FIG. 2.

A data circumscribing region storing unit 15 produces circumscribing region data of each rendering data extracted by the data extraction unit 14 and stores the produced circumscribing region data in the main storage device 2 as a circumscribing region table (to be described below with reference to FIG. 11).

Note that the data circumscribing region storing unit 15 corresponds to the data circumscribing region storing unit 203 shown in FIG. 2.

A specified data determination unit 16 determines whether each rendering data extracted by the data extraction unit 201 is the specified data. The specified data determination unit 16 corresponds to the specified data determination unit 202 shown in FIG. 2.

Note that a determination reference (for example, the top text) is set to the specified data determination unit 16 in accordance with an initial value. Alternatively, the determination reference is set to the specified data determination unit 16 by a specification by the user via the user interface unit 12.

A data synthesizing unit 17 forms a group of data by synthesizing a data group determined as the specified data by the specified data determination unit 16 and a data group other than the specified data group in accordance with an initial value or by a method specified by the user via the user interface unit 12.

The data synthesizing unit 17 corresponds to the data synthesizing unit 204 shown in FIG. 2.

A print data production unit 18 renders the rendering data grouped by the data synthesizing unit 17 to produce bitmap data.

Note that in this rendering processing, the print data production unit 18 performs the processing in a parallel manner by distributing the rendering processing per each group.

With this configuration, the processing performance can be improved in the case where the central processing unit 1 has the multi-processor configuration.

A print command control unit 19 serves as one of the functions of the printer driver 11. The print command control unit 19 changes the print data produced by the print data production unit 18 into a print command that can be used by the printer 7.

In addition, the print command control unit 19 controls the whole print command.

A data sending/receiving unit 20 serves as one of the functions of the OS 9. The data sending/receiving unit 20 sends and receives data between the host device 30 and the printer 7 through the connection via the Centronics interface or the network.

In addition, the printing device (printer) 7 performs print processing according to an instruction from the host device 30 that is connected to the printer 7.

Figure 10:
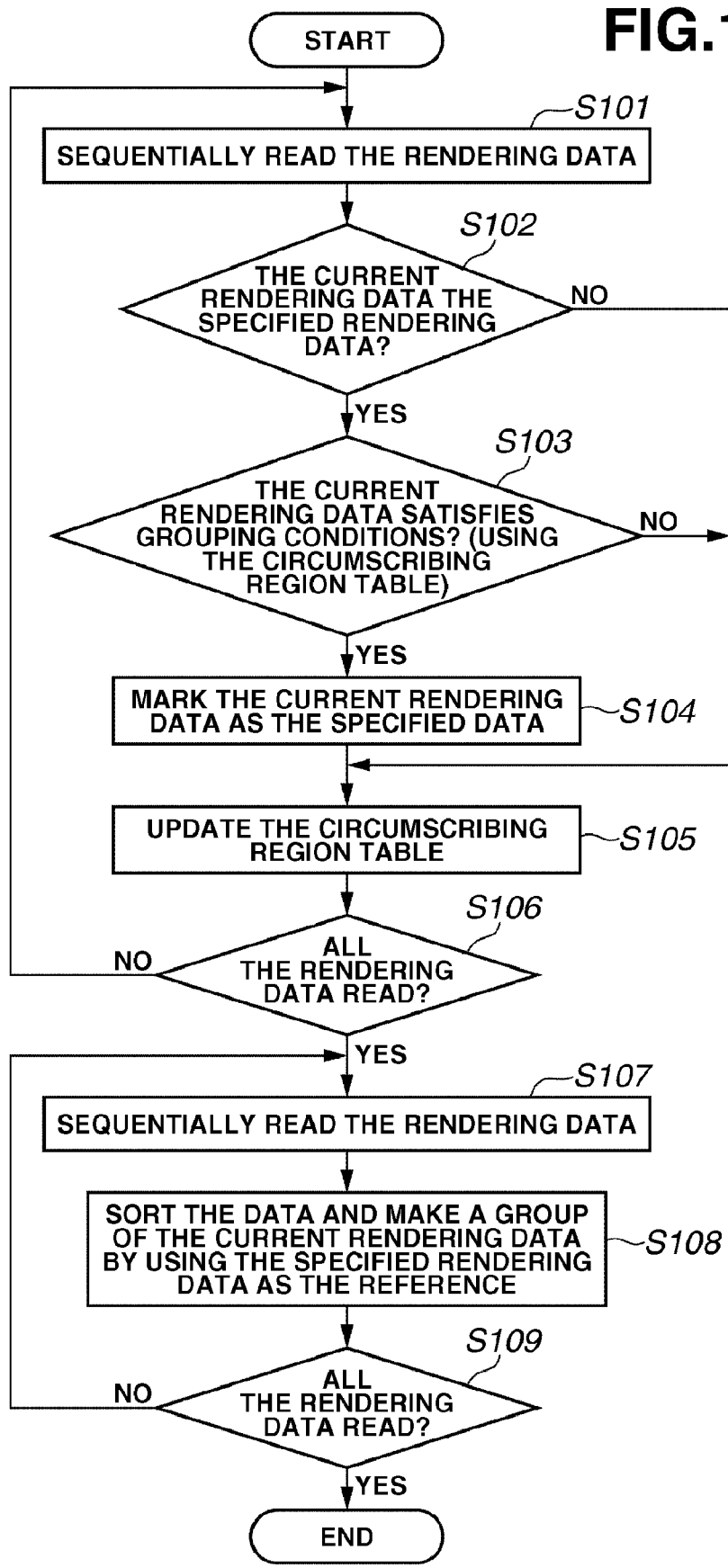
FIG. 10 is a flow chart illustrating an example of the procedure for first control processing in an image processing apparatus (image processing method) according to an embodiment of the present invention.

Note that the grouping processing by the printer driver 11 (especially, the data extraction unit 14, the data circumscribing region storing unit 15, the specified data determination unit 16, and the data synthesizing unit 17) is programmed based on the flow chart for the method of grouping processing shown in FIG. 10.

Note that the rendering data input unit 101 and the rendering data output unit 103 shown in FIG. 1 are included in the OS 9 and the printer driver 11, although not shown in FIG. 9.

Hereinbelow, the grouping processing method according to the present embodiment is described with reference to the flow chart of FIG. 10.

FIG. 10 is a flow chart illustrating an example of the procedure for first control processing in the image processing apparatus (image processing method) according to the present embodiment, which corresponds to the grouping processing.

Note that the processing illustrated in the flowchart of FIG. 10 is implemented in a manner such that the central processing unit 1 shown in FIG. 7 executes the programs (the OS 9, the application program 10, and the printer driver 11) read from the auxiliary storage device 3 on the main storage device 2.

First, when a command for performing printing is input by a user using the input device 4, the OS 9, among the programs read to the main storage device 2 from the auxiliary storage device 3, receives a message to that effect.

Then, the OS 9 sends the message to perform printing to the application program 10, which is currently active.

The application program 10 converts the message into a command that can be recognized by the OS 9 and sends a message of print data or command to the OS 9.

Then, the OS 9 converts the received message into a command that can be recognized by the printer driver 11 and sends a message of the command to the printer driver 11.

When a message for initialization is sent to the printer driver 11, the printer driver 11 determines the specified rendering data based on the setting by the user interface unit 12 or a default value.

First, the data extraction unit 14 extracts each rendering data among the data input to the printer driver 11 by the OS 9 and stores the extracted rendering data in a given region in the main storage device 2.

Then, the printer driver 11 starts the processing shown in the flow chart of FIG. 10.

When the processing is started, first, in step S101, the specified data determination unit 16 reads one piece of the rendering data that is stored in the main storage device 2 in a given order.

For example, when the top text string is set as the specified data, the specified data determination unit 16 reads the data from data that is higher in the Z-axis.

Hereinafter, this rendering data is referred to as current rendering data.

Then, in step S102, the specified data determination unit 16 determines whether the current rendering data is the specified rendering data.

If the current rendering data is determined as the specified rendering data, the specified data determination unit 16 determines in step S103 whether the current rendering data satisfies a grouping condition.

In this case, the specified data determination unit 16 uses circumscribing region data of the rendering data already stored in a circumscribing region table in the main storage device 2 shown in FIG. 11, as a reference of the determination.

For example, when the rendering data for rendering the "top text string" is set as the specified rendering data, the specified data determination unit 16 determines in step S102 whether the current rendering data is the rendering data for rendering text.

Then, in step S103, the specified data determination unit 16 determines whether the rendering data of an object having the circumscribing region that overlaps the circumscribing region for the text that is rendered by the rendering data of text is already present in the circumscribing region table.

In addition, when the rendering data for rendering the "background" is set as the specified rendering data, the specified data determination unit 16 determines in step S102 and step S103 whether the current rendering data is the rendering data for rendering the "background".

FIG. 11 is a diagram illustrating a configuration of the circumscribing region table produced by the data circumscribing region storing unit 15 shown in FIG. 9 and stored in the main storage device 2 shown in FIG. 7.

As shown in FIG. 11, the circumscribing region table includes at least an ID column 1101 for identifying the rendering data and the data for specifying a circumscribing rectangle of the rendering data (here, top-left coordinates column 1102 for specifying top-left coordinates of the circumscribing rectangle and bottom-right coordinates column 1103 for specifying bottom-right coordinates of the circumscribing rectangle).

The circumscribing region table further includes a type of the rendering data column 1104 (namely, text, graphics (a circle, a triangle, and a rectangle), and an image).

Referring back to the flow chart of FIG. 10, if the current rendering data is determined to satisfy the grouping condition in step S103, the specified data determination unit 16 marks the current rendering data as the specified rendering data in step S104.

That is, information indicating the specified rendering data is linked with the current rendering data to be stored in a given region of the main storage device 2. Then, the processing advances to step S105.

Note that if the specified data determination unit 16 determines that the current rendering data is not the specified rendering data in step S102, the processing directly advances to step S105.

In addition, if the specified data determination unit 16 determines that the current rendering data does not satisfy the grouping condition in step S103, the processing directly advances to step S105.

Next, in step S105, the data circumscribing region storing unit 15 stores the circumscribing region data of the current rendering data (namely, the top-left coordinates of the circumscribing rectangle and the bottom-right coordinates of the circumscribing rectangle) into the circumscribing region table (that is, the data circumscribing region storing unit 15 updates the circumscribing region table).

Next, in step S106, the specified data determination unit 16 determines whether all the rendering data stored in the main storage device 2 are already read. If it is determined in step S106 that not all the rendering data stored in the main storage device 2 are read, the processing returns to step S101 where the next rendering data is read.

If the specified data determination unit 16 determines in step S106 that all the rendering data are already read, the processing advances to step S107 where the data synthesizing unit 17 reads one piece of the rendering data that is stored in the main storage device 2 in a given order. Hereinafter, this rendering data is referred to as current rendering data.

Then, in step S108, the data synthesizing unit 17 groups the current rendering data based on the specified rendering data marked in step S104.

For example, as shown in FIG. 5 and FIG. 6, in the case where the grouping is performed to generate two layers including a specified rendering data group and a group of rendering data other than the specified rendering data, the grouping processing is performed as described below.

When the current data is the specified data, the data synthesizing unit 17 determines that the current rendering data belongs to the specified rendering data group. On the other hand, when the current rendering data is not the specified data, the data synthesizing unit 17 determines that the current rendering data belongs to the group of rendering data other than the specified rendering data.

Then, the data synthesizing unit 17 links information for identifying the determined group with the current rendering data and, then, stores the current rendering data in the main storage device 2.

In addition, as shown in FIG. 4, in the case where the grouping is performed to generate three layers including a specified rendering data group, a higher layer group above the specified rendering data, and a lower layer group below the specified rendering data, the grouping is performed in a manner as described below.

First, when the current rendering data is the specified data, the data synthesizing unit 17 determines that the current rendering data belongs to the specified rendering data group.

On the other hand, when the current rendering data is not the specified rendering data, the data synthesizing unit 17 determines whether the current rendering data is higher or lower in the Z-axis, and then determines that the current rendering data belongs to the higher layer group above the specified rendering data or to the lower layer group below the specified rendering data.

Then, the data synthesizing unit 17 links information for identifying the determined group with the current rendering data and, then, stores the current rendering data in the main storage device 2.

Then, in step S109, the data synthesizing unit 17 determines whether all the rendering data stored in the main storage device 2 are already read. When it is determined in step S109 that not all the rendering data are read yet, the processing returns to step S107 where the next rendering data is read.

On the other hand, when it is determined in step S109 that all the rendering data are already read, the grouping processing ends.

Note that, here, the description is made as to the example in which the data is grouped in two or three layers. However, the configuration is not limited to this. That is, the data can be grouped into four or more layers.

Hereinbelow, the method of rendering processing according to the present embodiment is described with reference to the flow chart of FIG. 12.

Figure 12:
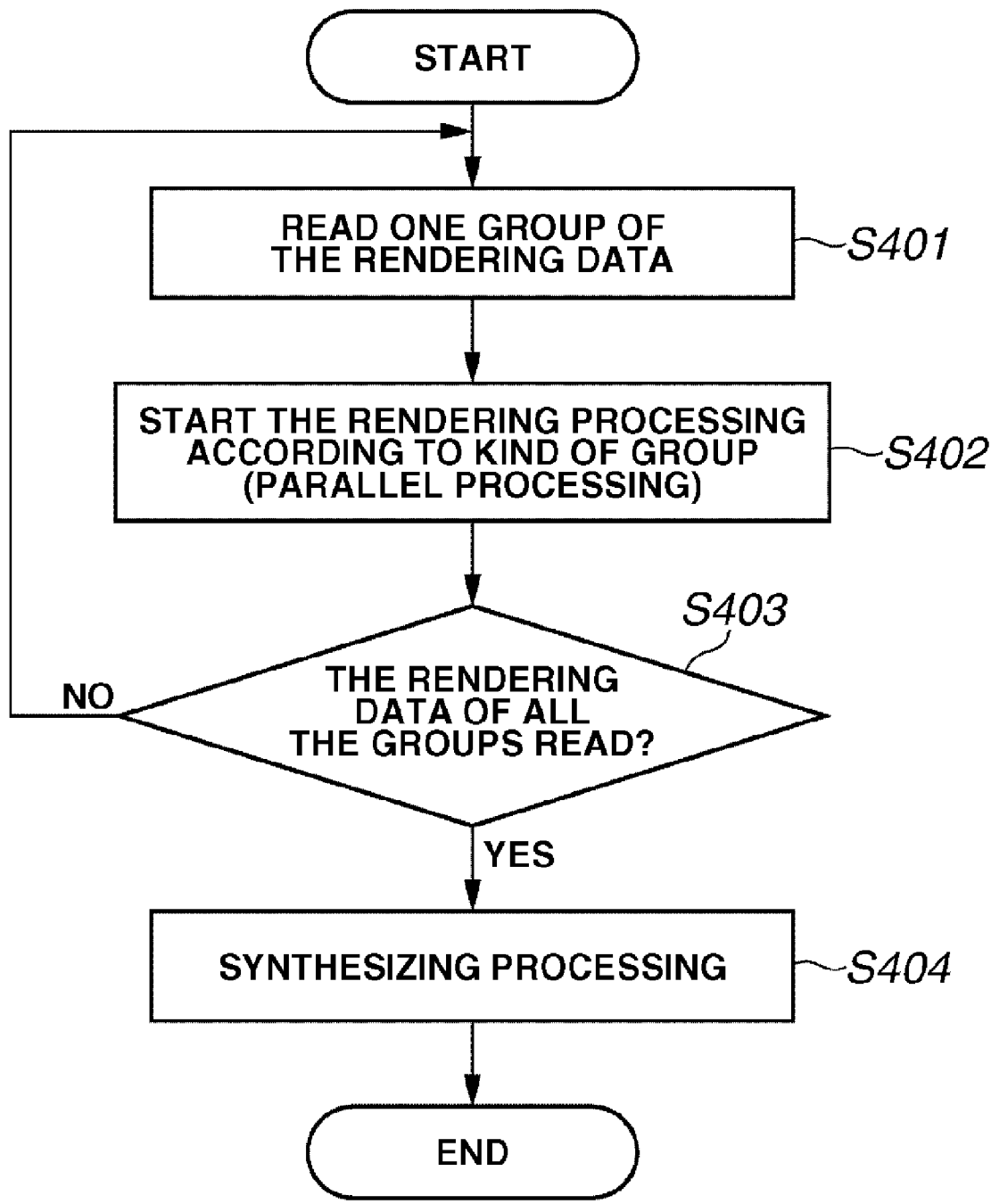
FIG. 12 is a flow chart illustrating an example of a procedure for second control processing in an image processing apparatus (image processing method) according to an embodiment of the present invention.

FIG. 12 is a flow chart illustrating an example of a procedure of second control processing in the image processing apparatus (image processing method), which corresponds to the rendering processing that is performed after the grouping processing shown in FIG. 10.

Note that the processing of this flow chart is performed in a manner such that the central processing unit 1 shown in FIG. 7 executes the programs (the OS 9, the application program 10, and the printer driver 11) read from the auxiliary storage device 3 on the main storage device 2.

The configuration of the present embodiment can be modified such that the printer driver 11 performs the grouping processing described above and outputs the grouped data to the printer 7.

In this case, the processing illustrated in FIG. 12 is performed by the controller of the printer 7, and the image rendered by the controller is printed by the printer engine of the printer 7.

First, when the grouping processing shown in FIG. 10 is completed, the printer driver 11 starts the processing shown in the flow chart of FIG. 12.

When the processing starts, first, in step S401, the print data production unit 18 reads one group of the rendering data that is stored in the main storage device 2.

Hereinafter, this one group of the rendering data is referred to as current group rendering data.

Then, in step S402, the print data production unit 18 starts processing for rendering the current group rendering data by the rendering method suitable to each group in a parallel manner (that is, the print data production unit 18 generates a thread).

For example, the print data production unit 18 performs the rendering processing on the lower layer group by using the scanline algorithm in consideration of overlapping.

In addition, the print data production unit 18 performs the rendering processing on the higher layer group by using the painter's algorithm in consideration of high processing speed.

According to the painter's algorithm, objects are sequentially rendered on a memory in a specified rendering order.

According to the scanline algorithm, a top object is determined for each scan line, and pixel values of the determined top object are rendered on a memory.

Hereinafter, the rendering method is more specifically described.

As shown in FIG. 5, in an example in which data is grouped into two groups including the background group 510 and the group 511 of rendering data other than the background, the rendering data of the background group 510 is rendered by using the painter's algorithm.

On the other hand, the rendering data of the group 511 of rendering data other than the background is rendered by using the scanline algorithm.

In addition, as shown in FIG. 6, in an example in which data is grouped into two groups including the top text group 610 and the group 611 of rendering data other than the top text, the rendering data of the top text group 610 is rendered by using the painter's algorithm.

On the other hand, the rendering data of the group 611 of rendering data other than the top text is rendered by using the scanline algorithm.

In this manner, the rendering processing for each group is performed by using the rendering method suitable to each group in a parallel manner, and thus the processing can be effectively performed while utilizing an advantage of each rendering method.

In addition, as shown in FIG. 6, when the higher layer group is set as the top text, the processing for compression and for reducing the resolution can be performed on the lower layer group. Thus, the speed of rendering processing can be improved.

In addition, if all the texts are the top texts, device fonts can be used.

With the device fonts used, a text font that the user desires to use can be surely used.

The device fonts refer to fonts provided in a device (here, the host device 30) as standard fonts.

When the printer 7 performs the rendering processing, the device fonts refer to fonts provided in the printer 7 as standard fonts.

Then, in step S403, the print data production unit 18 determines whether the rendering data of all the groups stored in the main storage device 2 are already read.

If it is determined that the rendering data of all the groups are not read yet, the processing returns to step S401. Then, the rendering data of the next group is read.

On the other hand, if it is determined that the rendering data of all the groups are already read, the processing advances to step S404. In step S404, the print data production unit 18 performs processing for synthesizing the images rendered for respective groups in step S403. Then, the processing ends.

For example, in the example shown in FIG. 6, in step S403, the top text group 610 is rendered on a memory by using the painter's algorithm, and the group 611 of rendering data other than the top text is rendered on the memory by using the scanline algorithm.

In the synthesizing processing in step S404, the image of the top text group 610 rendered on the memory is overwritten onto the image of the group 611 of rendering data other than the top text rendered on the memory so as to be synthesized.

When the rendering processing is completed, the print command control unit 19 of the printer driver 11 changes the print data produced by the rendering processing by the print data production unit 18 into a print command that can be used by the printer 7.

In addition, the data sending/receiving unit 20 of the OS 9 sends the changed print command to the printer 7.

Then, the printer 7 performs print processing based on the print command sent from the host device 30.

Note that, as described above, the print data production unit 18 is designed to have a multi-thread configuration. Thus, in step S402, the print data production unit 18 performs each rendering processing differently for each group in a parallel manner.

That is, if the central processing unit 1 has a multi-processor configuration, the rendering processing for each group can be performed in a parallel manner by using the plural processors. Thus, the rendering processing can be effectively performed.

Especially, the grouping of the rendering data into the higher layer group and the lower layer group is effective.

For example, for the method of grouping into two groups including the higher layer group and the lower layer group, there is a grouping method by which the rendering data is grouped into two groups such as the background group and the group of rendering data other than the background, as shown in FIG. 5. Also, there is a grouping method by which the rendering data is grouped into two groups such as the top text group and the group of rendering data other than the top text, as shown in FIG. 6.

As described above, extracting the specified rendering data from among the rendering data and grouping the rendering data with the specified rendering data as a reference can facilitate performing distributed processing using a multi-CPU and plural modules. Thus, the processing can be performed at a high speed.

In addition, grouping the rendering data into a higher layer and a lower layer and applying the painter's algorithm to the higher layer and applying the scanline algorithm to the lower layer can facilitate performing processing while utilizing the advantage of each rendering method.

In addition, when the higher layer group is set as the top text, the processing for compression and for reducing the resolution can be performed on the lower layer group. Thus, the speed of rendering processing can be improved.

In addition, with the device fonts used for the top text, the text fonts that the user desires to use can be surely used.

As described above, since rendering data is grouped based on specified rendering data, rendering data having overlapping regions can be divided in such a manner as to enable distributed rendering processing.

Accordingly, the effectiveness of performing the rendering processing with a device having a multi-processor configuration can be improved.

As a result, the print processing can be effectively performed.

Other Exemplary Embodiments

In another exemplary embodiment, a determination as to whether the rendering data is the top text is performed based on Z-axis sorting and Y-axis sorting.

Hereinbelow, a method of determining the top text as the specified rendering data is described with reference to the flow chart shown in FIG. 13 and FIG. 14.

Figure 13:
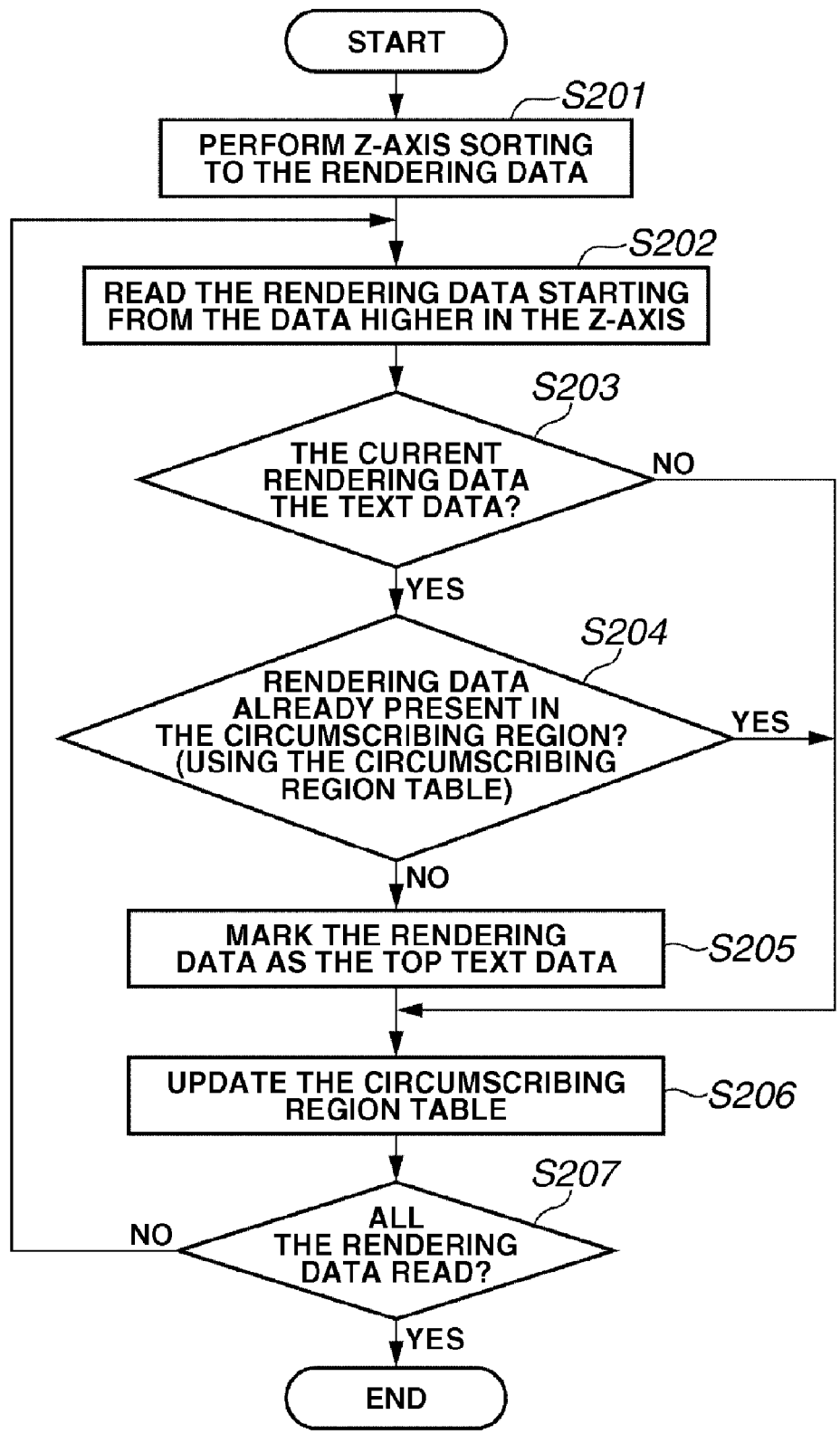
FIG. 13 is a flow chart illustrating an example of a procedure for third control processing in an image processing apparatus (image processing method) according to an embodiment of the present invention.
Figure 14:
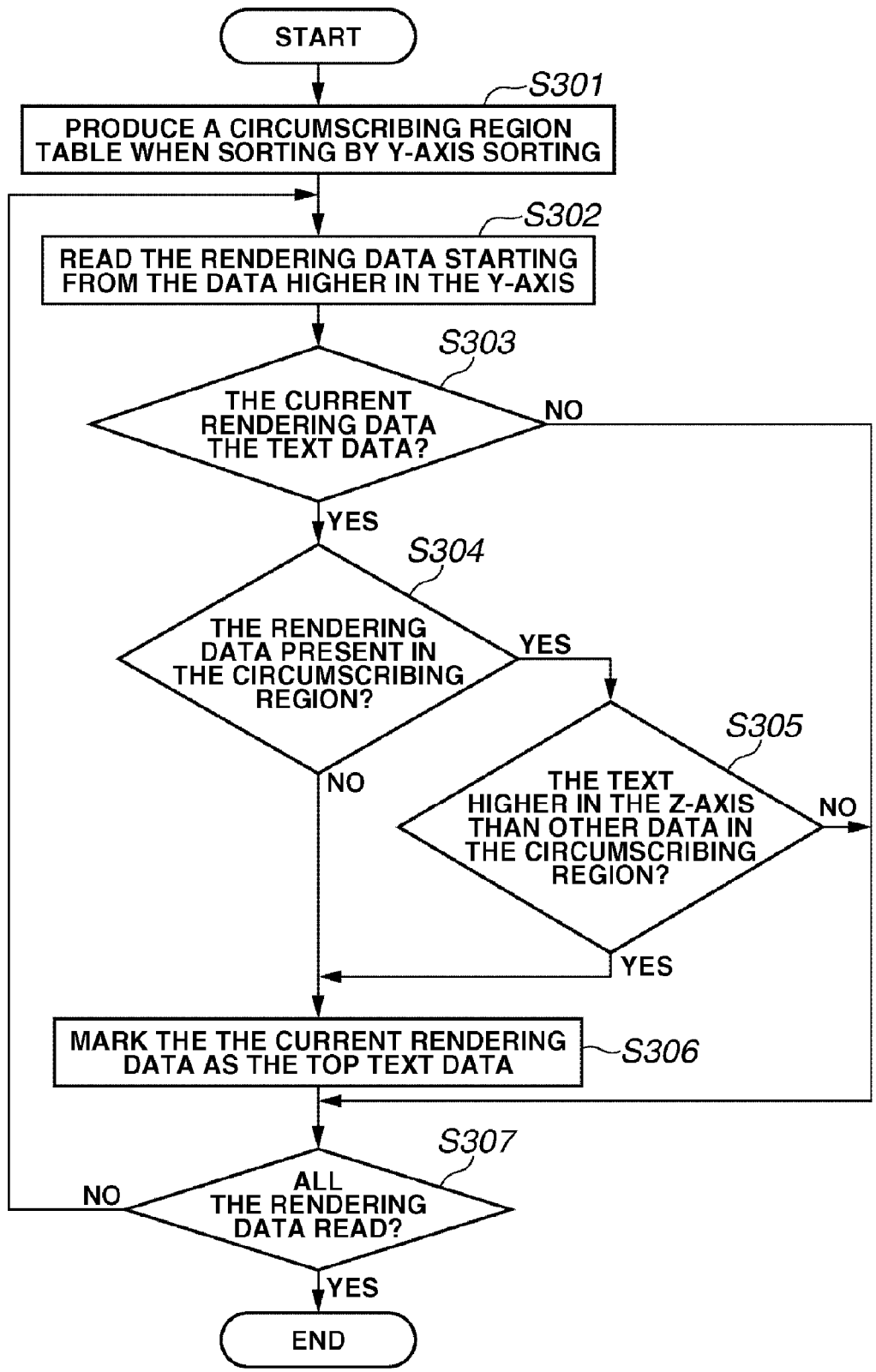
FIG. 14 is a flow chart illustrating an example of a procedure for fourth control processing in an image processing apparatus (image processing method) according to an embodiment of the present invention.
Figure 16:
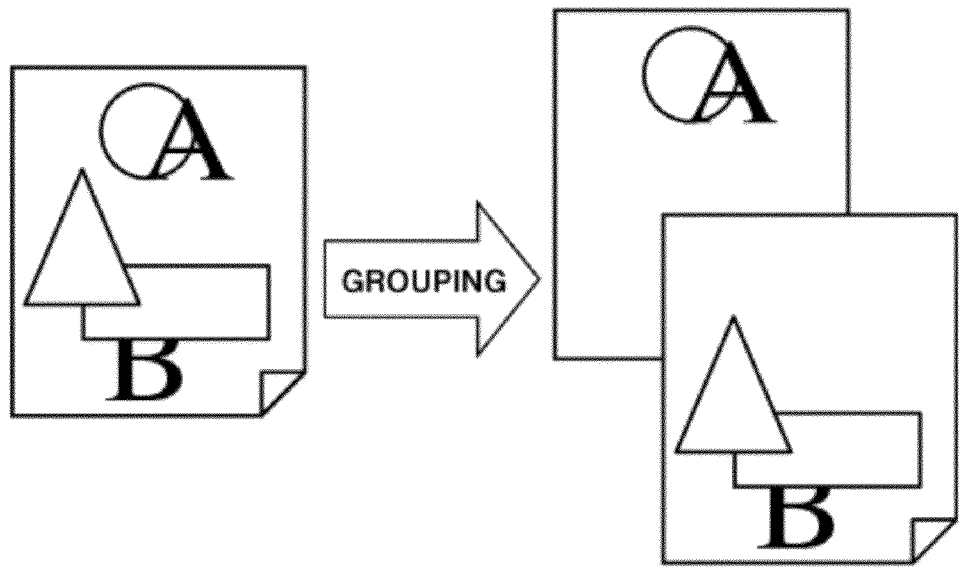
FIG. 16 is a diagram illustrating a conventional method of grouping rendering data.

The processing shown in FIG. 13 and FIG. 14 corresponds to an exemplary modification of the processing in steps S101 through S106 shown in FIG. 10.

The other configuration is similar to the configuration of the first embodiment.

First, the processing for determining whether the rendering data is the top text (the specified rendering data) by using the Z-axis sorting is described with reference to FIG. 13.

FIG. 13 is a flow chart illustrating an example of a procedure of third control processing in the image processing apparatus (image processing method), which corresponds to the processing for determining whether the rendering data is the top text (the specified rendering data) by using the Z-axis sorting.

The processing in the flow chart of FIG. 13 is performed in a manner such that the central processing unit 1 shown in FIG. 7 executes the programs (the OS 9, the application program 10, and the printer driver 11) read from the auxiliary storage device 3 on the main storage device 2.

When the processing in the flow chart shown in FIG. 13 starts, first, in step S201, the specified data determination unit 16 performs the Z-axis sorting on the rendering data stored in the main storage device 2.

Then, in step S202, the specified data determination unit 16 reads one piece of the rendering data stored in the main storage device 2, which has been Z-axis sorted, in the order of data higher in the Z-axis.

Hereinbelow, this rendering data is referred to as current rendering data.

The, in step S203, the specified data determination unit 16 determines whether the current rendering data is the rendering data for rendering text (text data).

If it is determined that the current rendering data is the text data, the processing proceeds to step S204.

In step S204, the specified data determination unit 16 determines whether the rendering data of an object that has a circumscribing region that overlaps the circumscribing region for the text that is rendered using the current rendering data is present in the rendering data that is already read.

This determination by the specified data determination unit 16 is performed by determining whether the circumscribing region data that overlaps the circumscribing region for the text that is rendered using the current rendering data is already stored in the circumscribing region table (FIG. 11).

Then, if it is determined in step S204 that the rendering data of an object that has a circumscribing region that overlaps the circumscribing region for the text that is rendered using the current rendering data is not present in the rendering data that is already read, the processing advances to step S205.

Then, in step S205, the specified data determination unit 16 marks the current rendering data as the top text (the specified rendering data).

That is, the specified data determination unit 16 links information indicating the top text (the specified rendering data) with the current rendering data to be stored in a given region of the main storage device 2. Then, the processing advances to step S206.

If the specified data determination unit 16 determines in step S203 that the current rendering data is not the text data, the processing directly advances to step S206.

In addition, if the specified data determination unit 16 determines in step S204 that the rendering data of an object that has a circumscribing region that overlaps the circumscribing region for the text that is rendered using the current rendering data is present in the rendering data that is already read, the processing also advances to step S206.

Then, in step S206, the data circumscribing region storing unit 15 stores the circumscribing region data for the current rendering data (namely, the top-left coordinates of the circumscribing rectangle and the bottom-right coordinates of the circumscribing rectangle) into the circumscribing region table (that is, the data circumscribing region storing unit 15 updates the circumscribing region table).

Then, in step S207, the specified data determination unit 16 determines whether all the rendering data stored in the main storage device 2 are already read. If it is determined that not all the rendering data stored in the main storage device 2 are already read, the processing returns to step S202. Then, the next rendering data is read.

On the other hand, if the specified data determination unit 16 determines in step S207 that all the rendering data are already read, the processing ends. Then, the processing advances to step S107 shown in FIG. 10.

Next, the processing for determining whether the rendering data is the top text (the specified rendering data) by using the Y-axis sorting is described with reference to FIG. 14.

FIG. 14 is a flow chart illustrating an example of a procedure of fourth control processing in the image processing apparatus (image processing method), which corresponds to the processing for determining whether the rendering data is the top text (the specified rendering data) by using the Y-axis sorting.

Note that the processing in the flow chart of FIG. 14 is performed in a manner such that the central processing unit 1 shown in FIG. 7 executes the programs (the OS 9, the application program 10, and the printer driver 11) read from the auxiliary storage device 3 on the main storage device 2.

When the processing in the flow chart shown in FIG. 14 starts, first, in step S301, the specified data determination unit 16 performs the Y-axis sorting on the rendering data stored in the main storage device 2.

Then, the data circumscribing region storing unit 15 stores the circumscribing region data for each rendering data (namely, the top-left coordinates of the circumscribing rectangle and the bottom-right coordinates of the circumscribing rectangle) into the circumscribing region table (that is, the data circumscribing region storing unit 15 produces the circumscribing region table).

Then, in step S302, the specified data determination unit 16 reads one piece of the rendering data stored in the main storage device 2, which has been Y-axis sorted, in the order of data higher in the Y-axis.

Hereinbelow, this rendering data is referred to as current rendering data.

In step S303, the specified data determination unit 16 determines whether the current rendering data is the rendering data for rendering text (text data).

If it is determined that the current rendering data is the text data, the processing proceeds to step S304.

In step S304, the specified data determination unit 16 determines whether other rendering data for rendering an object that has a circumscribing region that overlaps the circumscribing region for the text that is rendered using the current rendering data is present in the rendering data that is already read.

This determination by the specified data determination unit 16 is performed by determining whether the circumscribing region data that overlaps the circumscribing region for the text that is rendered using the current rendering data is already stored in the circumscribing region table (FIG. 11).

Then, if it is determined in step S304 that other rendering data for rendering an object that has a circumscribing region that overlaps the circumscribing region for the text that is rendered using the current rendering data is not present in the rendering data that is already read, the processing advances to step S306.

Then, in step S306, the specified data determination unit 16 marks the current rendering data as the top text (the specified rendering data).

That is, the specified data determination unit 16 links information indicating the top text (the specified rendering data) with the current rendering data to be stored in a given region of the main storage device 2. Then, the processing advances to step S307.

On the other hand, if the specified data determination unit 16 determines in step S304 that the rendering data of an object that has a circumscribing region that overlaps the circumscribing region for the text that is rendered using the current rendering data is present in the rendering data that is already read, the processing advances to step S305.

Then, in step S305, the specified data determination unit 16 determines whether the text that is rendered using the current rendering data is higher in the Z-axis than the object that is rendered using other rendering data that has the overlapping circumscribing region.

Then, if it is determined that the text that is rendered using the current rendering data is higher in the Z-axis than the object that is rendered using other rendering data that has the overlapping circumscribing region, the processing advances to step S306.

Then, the current rendering data is marked as the top text (the specified rendering data). Then the processing advances to step S307.

On the other hand, if it is determined in step S305 that the text that is rendered using the current rendering data is not higher in the Z-axis than the object that is rendered using other rendering data that has the overlapping circumscribing region, the processing directly advances to step S307.

In addition, if the specified data determination unit 16 determines in step S303 that the current rendering data is not the text data, the processing directly advances to step S307.

Then, in step S307, the specified data determination unit 16 determines whether all the rendering data stored in the main storage device 2 are already read. If it is determined that not all the rendering data stored in the main storage device 2 are already read, the processing returns to step S302. Then, the next rendering data is read.

On the other hand, if the data extraction unit 14 determines that all the rendering data are already read, the processing ends. Then, the processing advances to step S107 shown in FIG. 10.

As described above with reference to FIG. 13 and FIG. 14, extracting the "top text" that is the specified rendering data from among the rendering data and grouping the rendering data based on the specified rendering data can facilitate performing distributed processing using a multi-CPU and plural modules. Thus, the processing can be performed at a high speed.

In addition, according to another exemplary embodiment, as shown in FIG. 4, the specified data determination unit 16 determines specified type of rendering data (in FIG. 4, the rendering data of the circle and the rendering data of the rectangle) as the specified rendering data.

Then, the data synthesizing unit 17 groups the rendering data into the specified data group 411, the group 410 in the higher layer than the specified data, and the group 411 in the lower layer than the specified data, based on circumscribing rectangle regions stored in the data circumscribing region storing unit 15.

Then, the print data production unit 18 performs rendering processing suitable to each of the specified data group 411, the higher layer group 410, and the lower layer group 412 in a parallel manner. Thus, the processing can be performed at a high speed.

The present invention can be implemented and applied as a system, an apparatus, a method, a program, or a storage medium.

More specifically, the present invention can be applied to a system including a plurality of devices. In addition, the present invention can be applied to an apparatus that includes only one device.

Note that the grouping processing and the rendering processing can also be performed by the printer 7 instead of the printer driver 11.

In addition, the configuration can be modified such that the grouping processing only is performed by the printer driver 11 and the rendering processing is performed by the printer 7.

In addition, the grouping processing and the rendering processing can also be performed by a display device or an application that performs bitmap processing.

In addition, in the above-described embodiments, the specified data determination unit 16 determines the specified rendering data based on a circumscribing region for an object that is rendered using each rendering data.

However, the configuration can be modified such that the specified data determination unit 16 determines the specified rendering data based on a rendering region of the object itself that is rendered using each rendering data.

For example, the rendering data for rendering top text can be determined as the specified rendering data.

In this case, the rendering data for rendering the text onto which the rendering region of another object itself is not rendered in an overlapped manner can be determined as the specified rendering data.

Note that the processing for grouping the rendering data and the processing for rendering the rendering data according to the present invention can be applied to rendering data in three-dimensional graphics.

Hereinbelow, with reference to a memory map shown in FIG. 15, the description is made as to the configuration of the memory map of the storage medium that stores various types of data processing programs that can be read by an apparatus (computer) to which the image processing apparatus (image processing method) according to the present invention can be applied.

FIG. 15 is a diagram illustrating a memory map of a storage medium (recording medium) that stores the various types of data processing programs that can be read by an apparatus (computer) to which the image processing apparatus (image processing method) according to an embodiment of the present invention can be applied.

Note that although not shown in FIG. 15, information for managing the programs stored in the storage medium such as version information and information concerning the creator of a program, for example, can be stored and accessed by the host computer. In addition, information that depends on the OS of the device that reads the program such as an icon for identifying and displaying the program, for example, can be stored and accessed by the host computer.

In addition, data that is subordinate to the various types of programs is also managed in a directory.

In addition, a program for installing the various types of programs on a computer can be stored. In addition, in the case where a program to be installed is compressed, a program for decompressing the compressed program can be stored.

In addition, the functions according to the above-described embodiments shown in FIG. 10, FIG. 12, FIG. 13, and FIG. 14 can be implemented by a host computer using a program that is externally installed.

In this case, the present invention is applied to the case where a group of information including the program is supplied to an output device from a storage medium such as a CD-ROM, a flash memory, and an FD or from an external storage medium through a network.

An aspect of the present invention can also be achieved by providing a system or a device with a storage medium storing program code of software implementing the functions of the embodiments and by reading and executing the program code stored in the storage medium with a computer of the system or the device (a CPU or an MPU). In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a flexible disk, a hard disk, an optical disk, a magneto-optical disk, an MO, a CD-ROM, a CD-R, a CD-RW, a magnetic tape, a nonvolatile memory card, a ROM, and a DVD, for example, can be used.

In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium such as a hard disk.

In addition, the above program can also be supplied by downloading a compressed file that includes an automatic installation function from the web site to a storage medium such as a hard disk.

The functions of the above embodiments can also be implemented by dividing the program code into a plurality of files and downloading each divided file from different web sites. That is, a WWW server for allowing a plurality of users to download the program file for implementing the functional processing configures the present invention.

In addition, the above program can also be supplied by distributing a storage medium such as a CD-ROM and the like which stores the program according to the present invention after an encryption thereof; by allowing the user who is qualified for a prescribed condition to download a key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS (operating system) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

In addition, the present invention can be applied to a system that includes a plurality of devices and also to an apparatus that includes only one device.

In addition, the present invention can be applied to the case where an aspect of the present invention is achieved by supplying a program to a system or an apparatus.

In this case, the system or the apparatus can utilize the advantage of the present invention in a manner such that a storage medium storing a program represented by the software for achieving the present invention is read to the system or the apparatus.

The grouping processing and the rendering processing described above can be applied to the case where the grouping processing and the rendering processing are performed by an application device that outputs an image to a display device or by another application device for performing the bitmap processing. In this manner, the effectiveness of processing rendering data that having overlapping regions can be improved.

According to an exemplary embodiment of the present invention, processing of rendering data can be performed with distributed processing using a multi-CPU and a plurality of modules so as to enable grouping the rendering data. In addition, the rendering data can be grouped such that the rendering processing that utilizes the characteristics of each rendering processing method for each group can be performed at a high speed. Accordingly, an excellent environment for processing rendering data can be established.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-283296 filed Sep. 29, 2005, which is hereby incorporated by reference herein in its entirety.

What is claimed is:

1. An apparatus comprising:
a grouping unit configured to Z-axis-sort rendering data, to read the rendering data in the order of data higher in the Z-axis, to group text rendering data that does not overlap other rendering data into a first group, and to group rendering data that overlaps other rendering data and rendering data other than text rendering data into a second group;
a first rendering unit configured to render the text rendering data grouped into the first group using a painter's algorithm;
a second rendering unit configured to render the rendering data other than text grouped into the second group using a scanline algorithm; and
a combining unit configured to combine an image rendered by the first rendering unit and an image rendered by the second rendering unit,
wherein the rendering data grouped into the first group is specified by Z-axis-sorting the rendering data, reading the rendering data in the order of data higher in the Z-axis, determining whether the read rendering data is text rendering data, when the read rendering data is determined to be text rendering data, determining based on a circumscribing region table whether the determined text rendering data has a circumscribing region overlapping a circumscribing region of the rendering data that has been already read, when the determined text rendering data does not a circumscribing region overlapping the circumscribing region of the rendering data that has been already read, the determined text rendering data is marked as belonging to the first group, and storing the circumscribing region of the rendering data that has been already read into the circumscribing region table.

2. The apparatus according to claim 1, wherein the first rendering unit renders the text with a font of the apparatus.

3. The apparatus according to claim 1,
wherein, in the painter's algorithm, objects are rendered in a specified rendering order, and
wherein, in the scanline algorithm, a top object is determined for each scan line, and pixel values of the determined top object are rendered.

4. An apparatus comprising:
a grouping unit configured to Z-axis-sort rendering data, to read the rendering data in the order of data higher in the Z-axis, to group text rendering data that does not overlap other rendering data into a first group, and to group rendering data that overlaps other rendering data and rendering data other than text rendering data into a second group;

a first rendering unit configured to render the text rendering data grouped into the first group using a painter's algorithm;

a second rendering unit configured to render the rendering data other than text grouped into the second group using a scanline algorithm; and a printing unit configured to print an image rendered by the first rendering unit and an image rendered by the second rendering unit, wherein the rendering data grouped into the first group is specified by Z-axis-sorting the rendering data, reading the rendering data in the order of data higher in the Z-axis, determining whether the read rendering data is text rendering data, when the read rendering data is determined to be text rendering data, determining based on a circumscribing region table whether the determined text rendering data has a circumscribing region overlapping a circumscribing region of the rendering data that has been already read, when the determined text rendering data does not a circumscribing region overlapping the circumscribing region of the rendering data that has been already read, the determined text rendering data is marked as belonging to the first group, and storing the circumscribing region of the rendering data that has been already read into the circumscribing region table.

5. The apparatus according to claim 4, wherein the first rendering unit renders the text with a font of the apparatus.

6. A method comprising:

Z-axis-sort rendering data to read the rendering data in the order of data higher in the Z-axis (S202), group text rendering data that does not overlap other rendering data into a first group, and group rendering data that overlaps other rendering data and rendering data other than text rendering data into a second group;

rendering the text rendering data grouped into the first group using a painter's algorithm by a first rendering unit;

rendering the rendering data other than text grouped into the second group using a scanline algorithm by a second rendering unit; and combining an image rendered by the first rendering unit and an image rendered by the second rendering unit, wherein the rendering data grouped into the first group is specified by Z-axis-sorting the rendering data, reading the rendering data in the order of data higher in the Z-axis, determining whether the read rendering data is text rendering data, when the read rendering data is determined to be text rendering data, determining based on a circumscribing region table whether the determined text rendering data has a circumscribing region overlapping a circumscribing region of the rendering data that has been already read, when the determined text rendering data does not a circumscribing region overlapping the circumscribing region of the rendering data that has been already read, the determined text rendering data is marked as belonging to the first group, and storing the circumscribing region of the rendering data that has been already read into circumscribing region table.

7. The method according to claim 6, further comprising rendering the text with a font.

8. The method according to claim 6, wherein, in the painter's algorithm, objects are rendered in a specified rendering order, and wherein, in the scanline algorithm, a top object is determined for each scan line, and pixel values of the determined top object are rendered.

9. A method comprising:

Z-axis-sort rendering data to read the rendering data in the order of data higher in the Z-axis, group text rendering data that does not overlap other rendering data into a first group, and group rendering data that overlaps other rendering data and rendering data other than text rendering data into a second group;

rendering the text rendering data grouped into the first group using a painter's algorithm by a first rendering unit;

rendering the rendering data other than text into the second group using a scanline algorithm by a second rendering unit;

printing an image rendered by the first rendering unit and an image rendered by the second rendering unit; and producing circumscribing region data of each rendering data, wherein the rendering data grouped into the first group is specified by Z-axis-sorting the rendering data, reading the rendering data in the order of data higher in the Z-axis, determining whether the read rendering data is text rendering data, when the read rendering data is determined to be text rendering data, determining based on a circumscribing region table whether the determined text rendering data has a circumscribing region overlapping a circumscribing region of the rendering data that has been already read, when the determined text rendering data does not a circumscribing region overlapping the circumscribing region of the rendering data that has been already read, the determined text rendering data is marked as belonging to the first group, and storing the circumscribing region of the rendering data that has been already read into the circumscribing region table.

10. The method according to claim 9, further comprising rendering the text with a font.

11. An article of manufacture comprising:

a machine-accessible storage medium including data that, when accessed by a machine, cause the machine to perform operations comprising:

Z-axis-sort rendering data to read the rendering data in the order of data higher in the Z-axis, group text rendering data that does not overlap other rendering data into a first group, and group rendering data that overlaps other rendering data and rendering data other than text rendering data into a second group;

rendering the text rendering data grouped into the first group using a painter's algorithm by a first rendering unit;

rendering the rendering data other than text grouped into the second group using a scanline algorithm by a second rendering unit;

combining an image rendered by the first rendering unit and an image rendered by the second rendering unit; and producing circumscribing region data of each rendering data, wherein the rendering data grouped into the first group is specified by Z-axis-sorting the rendering data, reading the rendering data in the order of data higher in the Z-axis, determining whether the read rendering data is text rendering data, when the read rendering data is determined to be text rendering data, determining based on a circumscribing region table whether the determined text rendering data has a circumscribing region overlapping a circumscribing region of the rendering data that has been already read, when the determined text rendering data does not a circumscribing region overlapping the circumscribing region of the rendering data that has been already read, the determined text rendering data is marked as belonging to the first group, and storing the circumscribing region of the rendering data that has been already read into the circumscribing region table.

12. The article of manufacture according to claim 11, further comprising rendering the text with a font.

13. The article of manufacture according to claim 11, wherein, in the painter's algorithm, objects are rendered in a specified rendering order, and wherein, in the scanline algorithm, a top object is determined for each scan line, and pixel values of the determined top object are rendered.

14. An article of manufacture comprising:

A machine-accessible storage medium including data that, when accessed by a machine, cause the machine to perform operations comprising:

Z-axis-sort rendering data to read the rendering data in the order of data higher in the Z-axis, group text rendering data that does not overlap other rendering data into a first group, and group rendering data that overlaps other rendering data and rendering data other than text rendering data into a second group;

rendering the text rendering data grouped into the first group using a painter's algorithm by a first rendering unit;

rendering the rendering data other than text into the second group using a scanline algorithm by a second rendering unit;

printing an image rendered by the first rendering unit and an image rendered by the second rendering unit; and producing circumscribing region data of each rendering data, wherein the rendering data grouped into the first group is specified by Z-axis-sorting the rendering data, reading the rendering data in the order of data higher in the Z-axis, determining whether the read rendering data is text rendering data, when the read rendering data is determined to be text rendering data, determining based on a circumscribing region table whether the determined text rendering data has a circumscribing region overlapping a circumscribing region of the rendering data that has been already read, when the determined text rendering data does not a circumscribing region overlapping the circumscribing region of the rendering data that has been already read, the determined text rendering data is marked as belonging to the first group, and storing the circumscribing region of the rendering data that has been already read into circumscribing region table.

15. The article of manufacture according to claim 14, further comprising rendering the text with a font.

* * * * *